(12) United States Patent
Wachs et al.

(10) Patent No.: US 12,504,603 B1
(45) Date of Patent: Dec. 23, 2025

(54) ACTUATOR AND METHOD FOR PRECISE POSITIONING

(71) Applicant: BAE Systems Space & Mission Systems Inc., Bloomfield, CO (US)

(72) Inventors: Jordan S. Wachs, Sudbury, MA (US); Joseph H. Ho, Louisville, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 832 days.

(21) Appl. No.: 17/859,184

(22) Filed: Jul. 7, 2022

Related U.S. Application Data

(60) Provisional application No. 63/220,330, filed on Jul. 9, 2021.

(51) Int. Cl.
*G02B 7/183* (2021.01)

(52) U.S. Cl.
CPC .................................... *G02B 7/183* (2013.01)

(58) Field of Classification Search
None
See application file for complete search history.

(56) References Cited

U.S. PATENT DOCUMENTS

| | | | |
|---|---|---|---|
| 5,898,529 A | 4/1999 | Meyer et al. | |
| 5,969,892 A | 10/1999 | Slusher | |
| 6,478,434 B1 | 11/2002 | Streetman et al. | |
| 6,612,192 B2 | 9/2003 | Hardy et al. | |
| 7,369,723 B1 * | 5/2008 | Mescher | G02B 26/0875 385/33 |
| 9,354,422 B1 | 5/2016 | Quakenbush | |
| 9,377,614 B2 | 6/2016 | Laborde et al. | |
| 9,746,665 B1 | 8/2017 | Quakenbush | |
| 10,598,924 B2 | 3/2020 | Ostaszewski | |
| 11,841,223 B2 | 12/2023 | Howley et al. | |
| 12,130,423 B1 | 10/2024 | Ostaszewski | |

(Continued)

FOREIGN PATENT DOCUMENTS

| | | | | |
|---|---|---|---|---|
| FR | 2955398 A1 * | 7/2011 | | G02B 7/183 |
| WO | WO-2004057407 A1 * | 7/2004 | | G02B 26/0825 |
| WO | WO-2007090843 A2 * | 8/2007 | | G02B 3/14 |

OTHER PUBLICATIONS

U.S. Appl. No. 19/045,277, filed Feb. 4, 2025, Wachs et al.

(Continued)

*Primary Examiner* — William J Klimowicz
(74) *Attorney, Agent, or Firm* — Sheridan Ross P.C.

(57) ABSTRACT

Actuator systems and methods are provided. The actuator enables small positional changes to be made between a base or platform and a moveable element. In particular, the actuator includes prime movers that operate to apply a force to change a dimension of a body or stem of the actuator in a first direction, which in turn changes a dimension of the stem in a second direction that is perpendicular to the first direction due to the Poisson effect. The prime movers can be coupled to opposite sides of the actuator stem by a pair of arms disposed so as to form a hoop about the actuator stem. Alternatively, the prime movers can couple a hoop formed by a pair of arms to the actuator stem. A base of the stem can be mounted to the platform or other structure, while the moveable element can be mounted to an actuation platform of the stem on a side of the stem opposite the base.

19 Claims, 12 Drawing Sheets

(56) References Cited

U.S. PATENT DOCUMENTS

| | | | |
|---|---|---|---|
| 2004/0140737 A1 | 7/2004 | Barillot et al. | |
| 2006/0050419 A1* | 3/2006 | Ealey | G02B 26/06 359/849 |
| 2010/0202071 A1* | 8/2010 | Preumont | G02B 26/06 359/849 |
| 2011/0235966 A1* | 9/2011 | Mescher | G02B 26/0825 29/25.35 |
| 2013/0215527 A1* | 8/2013 | Beresnev | G02B 26/0825 359/849 |
| 2015/0316763 A1* | 11/2015 | Redding | G02B 26/0858 359/846 |
| 2022/0413259 A1* | 12/2022 | Hertwig | G02B 26/0825 |

OTHER PUBLICATIONS

"The LUVOIR Mission Concept Study Interim Report," National Aeronautics and Space Administration, Sep. 2018, 441 pages. [Submitted in Two Parts].

"The LUVOIR Mission Concept Study Final Report," National Aeronautics and Space Administration, Aug. 26, 2019, 426 pages. [Submitted in Two Parts].

Knight et al., "Ultra Stable Large Telescope Research and Analysis (ULTRA)," ExEP Technology Colloquium, May 20, 2019, 25 pages.

* cited by examiner

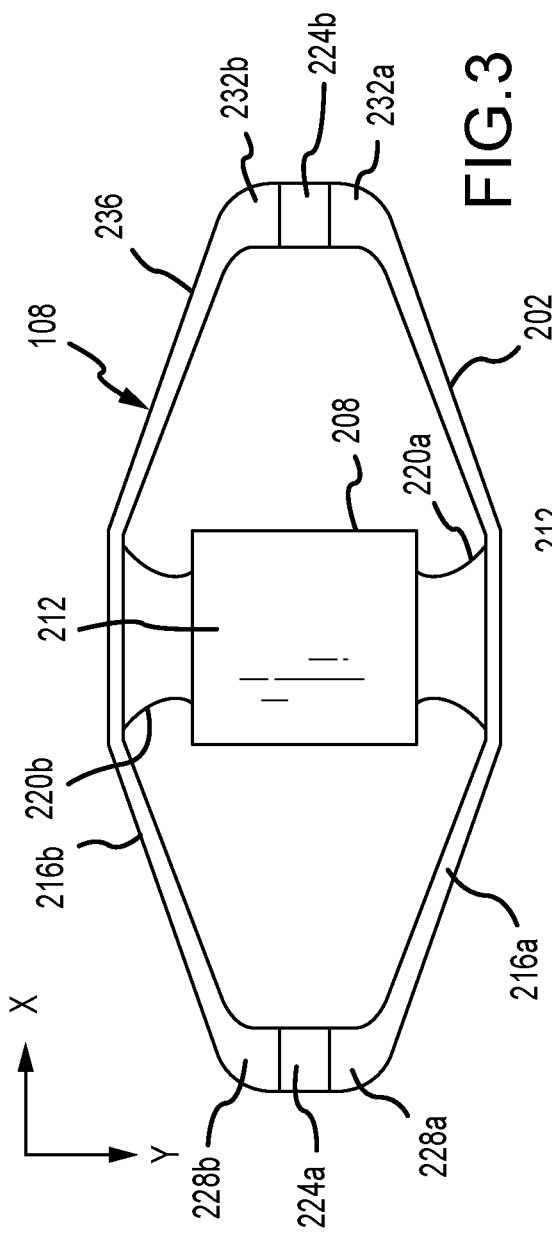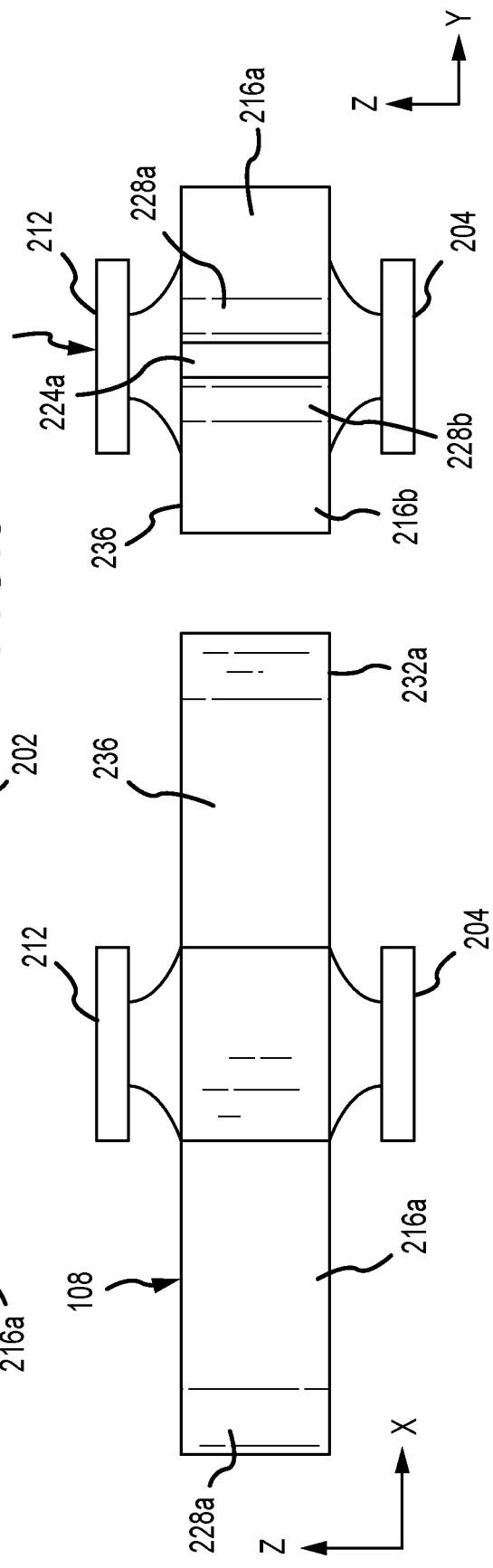

US 12,504,603 B1

ACTUATOR AND METHOD FOR PRECISE POSITIONING

CROSS-REFERENCE TO RELATED APPLICATION

This application claims the benefit of U.S. Provisional Patent Application Ser. No. 63/220,330, filed Jul. 9, 2021, the entire disclosure of which is hereby incorporated herein by reference.

FIELD

The present disclosure provides systems and methods for making sub-micron displacements of a supported object, such as a mirror.

BACKGROUND

High precision actuators are commonly used in applications where sub-micron displacements must be made accurately and repeatably. Systems that rely on such precise actuators include microscopes that rely on precise sample positioning, and optical assemblies that rely on nanometer-scale active positioning to satisfy alignment requirements. Previous precision actuators have achieved nanometer level positioning. However, applications for picometer-level actuator resolution are becoming apparent. For example, a new generation of space telescopes will require picometer-level position stability of the segments that comprise their primary mirrors.

High precision actuators can be provided in the form of electric stepper motors, magnetostrictive actuators, and piezoelectric actuators. For example, atomic force microscopes often use piezoelectric actuators. However, the motion resolution of piezoelectric actuators has been in the range of tens of nanometers. High precision actuators that combine a motor and a motion reduction stage are also available. An example is found in the James Webb Space Telescope (JWST), which incorporates motors combined with motion reducing actuator assemblies or flexures. The motors and flexures in the JWST enable nanometer level positioning of the telescope's mirror segments. However, an improvement in the movement resolution of three orders is needed to satisfy the mission requirements for the next generation of space-based telescopes. For example, future optical assemblies, such as the Large Ultraviolet Optical Infrared Surveyor (LUVOIR), are expected to require actuators with a stability of small fractions of a nanometer to position meter-class mirrors in a space environment.

In addition to providing fine control of the position of components, actuators are required to provide certain load bearing qualities. Previous actuator systems that use flexures to reduce motion must have relatively thin elements. These can be vulnerable to buckling or fatigue, and have limited load bearing capacities.

Accordingly, it would be desirable to provide an actuator that enabled high movement resolution, while also providing improved load bearing capacity.

SUMMARY

Actuators in accordance with embodiments of the present disclosure provide precision actuation by reducing the displacement induced by a prime mover through the Poisson effect and mechanical motion reduction. A piezoelectric transducer (PZT) or other similarly high precision actuator is used to apply a force to a bulk material in the plane orthogonal to the desired direction of actuation. In response to a compressive force, the material expands in directions perpendicular to the direction of the applied force due to Poisson's ratio. Conversely, in response to a tensile force, the material contracts in directions perpendicular to the direction of the applied force. The action of the bulk material in the actuation direction is reduced from the displacement caused by the actuators by the inclusion of bendable arms. An actuator in accordance with embodiments of the present disclosure allows for picometer-class motions, while maintaining the ability to support large loads in multiple axes. Moreover, an actuator in accordance with embodiments of the present disclosure is suitable for operation in a space-based environment.

Embodiments of the present disclosure achieve high positioning resolution by reducing the induced displacement of a prime mover via the Poisson effect and additional mechanical motion reduction, to achieve the desired actuation resolution. In accordance with embodiments of the present disclosure, the amount of motion reduction is tunable. For example, using a prime mover capable of movement with a resolution of one or more nanometers, such as PZTs, picometer-class actuation along a selected axis is possible. In addition to enabling high resolution movement, actuators in accordance with embodiments of the present disclosure provide high mechanical stiffness and load carrying capabilities.

Additional features and advantages of embodiments of the present disclosure will become more readily apparent from the following description, particularly when taken together with the accompanying drawings.

BRIEF DESCRIPTION OF THE DRAWINGS

FIG. 3 is a top plan view of the actuator of FIG. 2;

FIG. 4 is a side elevation view of the actuator of FIG. 2;

FIG. 5 is an end elevation view of the actuator of FIG. 2;

DETAILED DESCRIPTION

Figure 1:
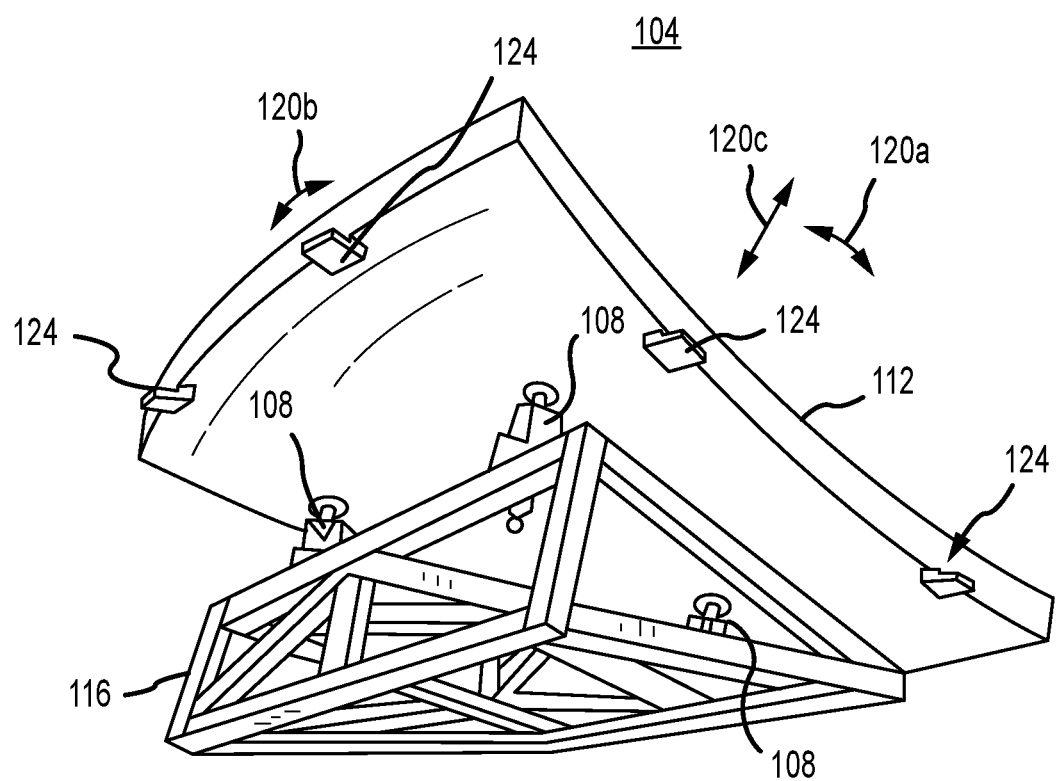
FIG. 1 depicts a portion of a system incorporating one or more actuators in accordance with embodiments of the present disclosure.
Figure 2:
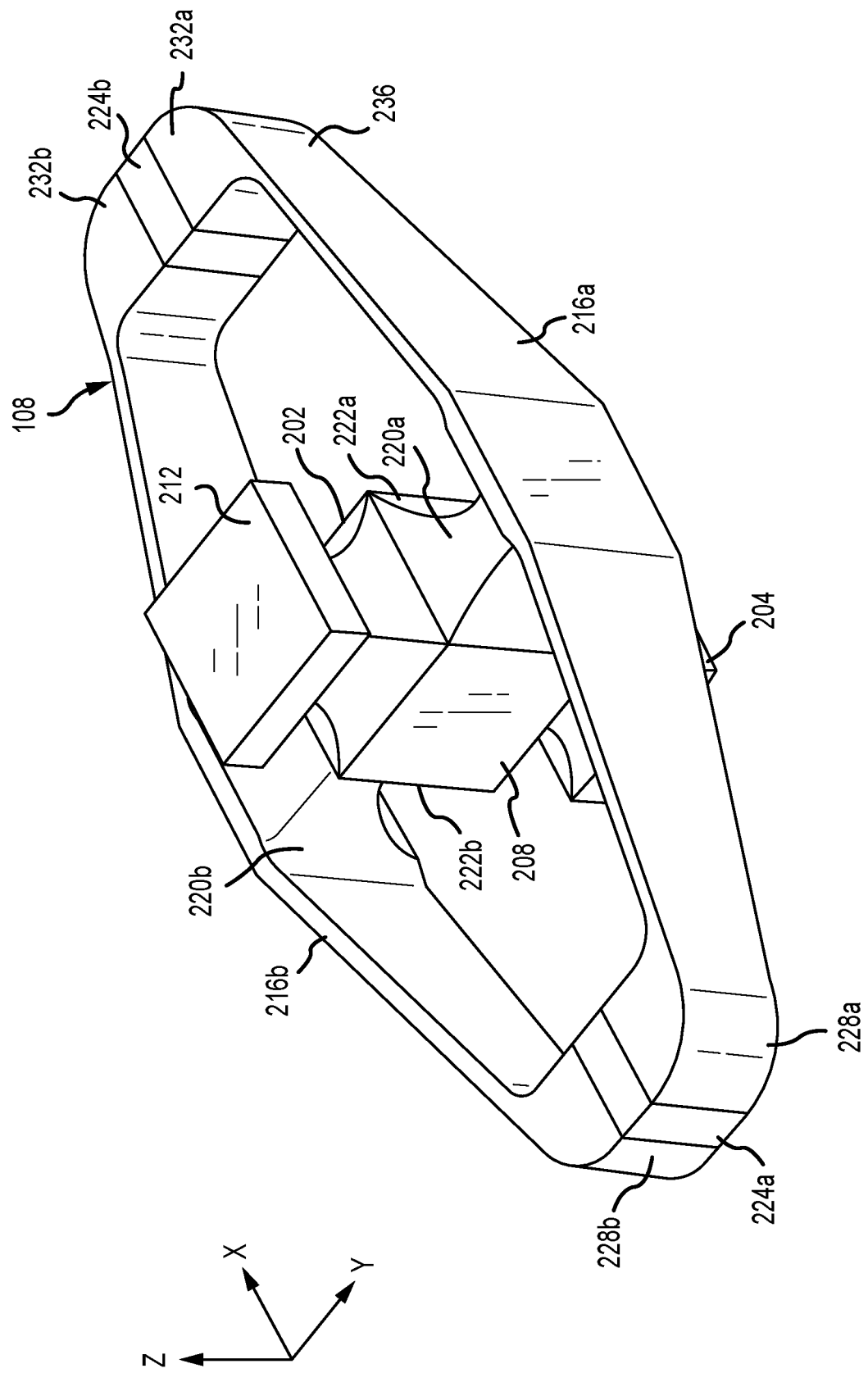
FIG. 2 is a perspective view of an actuator in accordance with embodiments of the present disclosure.

FIG. 1 depicts a portion of an example system or instrument 104 incorporating one or more actuators 108 in accordance with embodiments of the present disclosure. In this example, the instrument 104 is a telescope that includes a number of reflector or mirror segments 112 coupled to a back plane or support structure 116 by a plurality of actuators 108. As can be appreciated by one of skill in the art after consideration of the present disclosure, a plurality of telescope mirror segments 112 can be included in the same instrument 104 to provide a large reflector. Moreover, the actuators 108 enable active control of the individual mirror segments 112, ensuring that the desired optical characteristics of the telescope reflector are achieved and maintained after the reflector has been deployed and is in use. For instance, in the illustrated example, each mirror segment 112 is coupled to the support structure 116 by three actuators 108, allowing control of the position of the mirror segment 112 relative to the support structure 116 in at least three degrees of freedom by enabling tilt 120a, tip 120b, and focus or piston 120c type movements. In addition, a number of position sensors 124 can be included to provide positional information or feedback for use in operating the actuators 108 to achieve a desired position and configuration of each mirror segment 112.

An example actuator 108 in accordance with embodiments of the present disclosure is depicted in FIGS. 2-5. More particularly, the example actuator 108 is shown in a perspective view in FIG. 2, a top plan view in FIG. 3, a side elevation view in FIG. 4, and an end elevation view in FIG. 5. The actuator 108 generally includes a frame structure 202. The frame structure 202 includes a base 204, a stem or body 208, and an actuation platform 212. The base 204 is disposed at a first end (e.g. the bottom) of the stem 208, while the actuation platform 212 is disposed at a second end (e.g. the top) of the stem 208, opposite the first end. The frame structure 202 also includes first 216a and second 216b actuator arms that are disposed on opposite sides of the stem 208. The midpoints of the arms 216 are joined to the stem 208 by first 220a and second 220b load elements respectively. In particular, the first load element 220a joins a first side 222a of the body 208 to the midpoint of the first arm 216a, and the second load element 220b joins a second side 222b of the body 208, opposite the first side 222a, to the midpoint of the second arm 216b. A first prime mover 224a is interposed between a first end 228a of the first actuator arm 216a and a first end 228b of the second actuator arm 216b, while a second prime mover 224b is interposed between a second end 232a of the first actuator arm 216a and a second end 232b of the second actuator arm 216b. Together, the arms 216a and 216b and the prime movers 224a and 224b define a hoop or actuation structure 236 disposed around the stem 208 and in or parallel to a first plane (e.g. an X-Y plane). As examples, in at least some embodiments of the present disclosure, the actuator 108 base 204 is mounted to a support structure 116 of a system 104, and the actuation platform 212 is mounted to a mirror segment 112.

In accordance with embodiments of the present disclosure, at least some of the components or elements of the actuator 108 frame structure 202 are formed from a single, unitary piece of material. For example, the base 204, stem 208, actuation platform 212, load elements 220, and arms 216 can all be formed from a single piece of material. In other embodiments, a first half of the hoop structure 236 including the first arm 216a can be formed from a first unitary piece of material, a second half of the hoop structure 236 including the second arm 216b can be formed from a second unitary piece of material, and the base 204, stem 208, and actuation platform 212 can be formed from a third unitary piece of material. In accordance with still other embodiments of the present disclosure, a first half of the hoop structure 236 including the first arm 216a can be formed from a first unitary piece of material, a second half of the hoop structure 236 including the second arm 216b can be formed from a second unitary piece of material, the base 204 can be formed from a third unitary piece of material, the stem 208 can be formed from a fourth unitary piece of material, and the actuation platform 212 can be formed from a fifth unitary piece of material. Other combinations are possible. As an example, an actuator 108 frame structure 202 as disclosed herein can be formed by shaping a block of metal using electronic discharge machining techniques. As another example, an actuator 108 frame structure 202 as disclosed herein can be formed using additive manufacturing processes.

Prime movers 224 in accordance with embodiments of the present disclosure can include high precision actuators. For example, the prime movers 224 can include piezoelectric transducers. As other examples, the prime movers 224 can include lead magnesium niobate (PMN) electrostrictive actuators, voice coils, or any device that provides linear actuation suitable for the operating environment of the system 104 incorporating the actuator 108. As can be appreciated by one of skill in the art after consideration of the present disclosure, a prime mover 224 can therefore include a device that is capable of producing a force on the arms 216 in response to the application of a voltage.

Figure 6A:
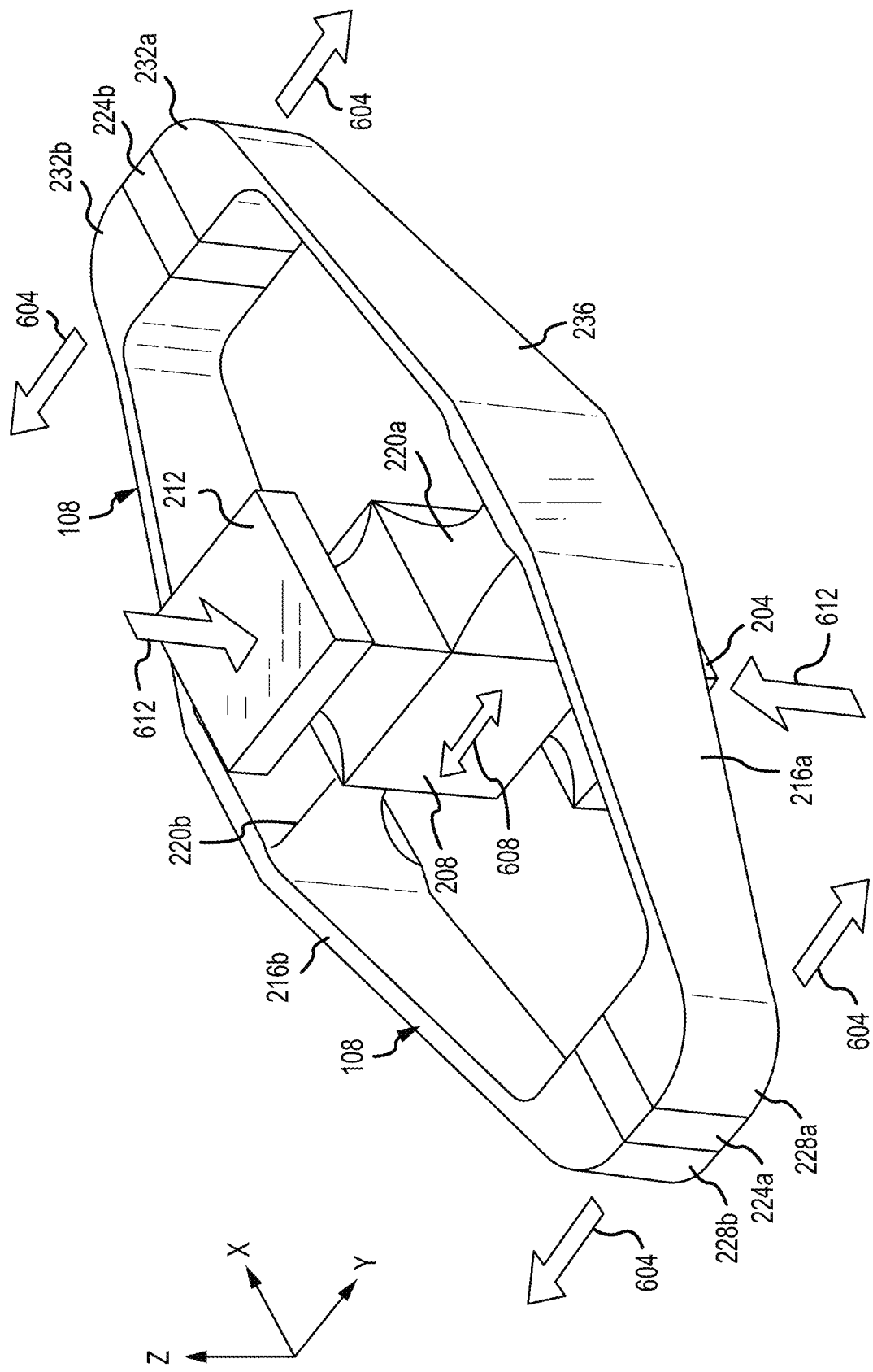
FIGS. 6A and 6B depict operational aspects of the actuator of FIG. 2.
Figure 6B:
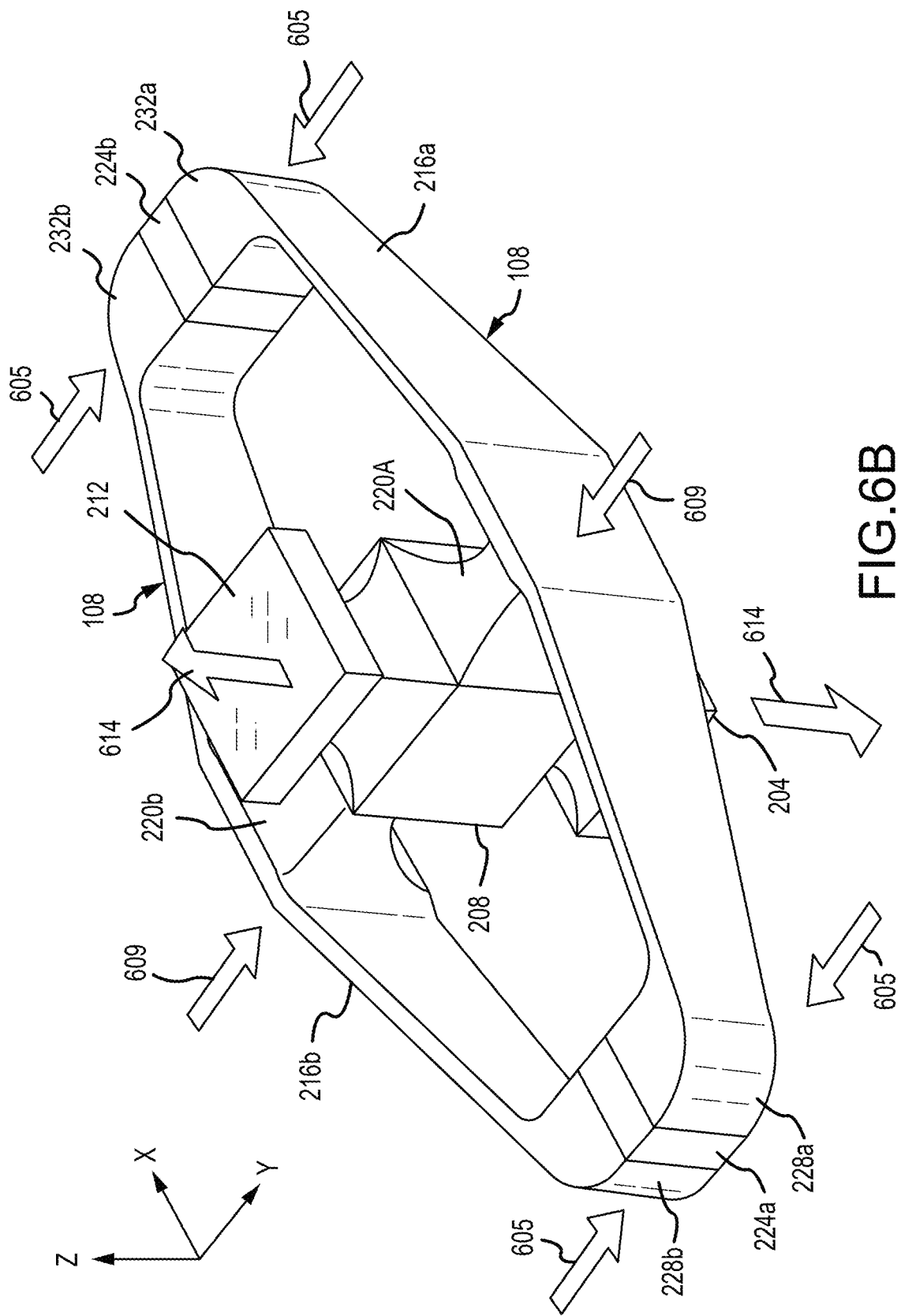
Figure 7A:
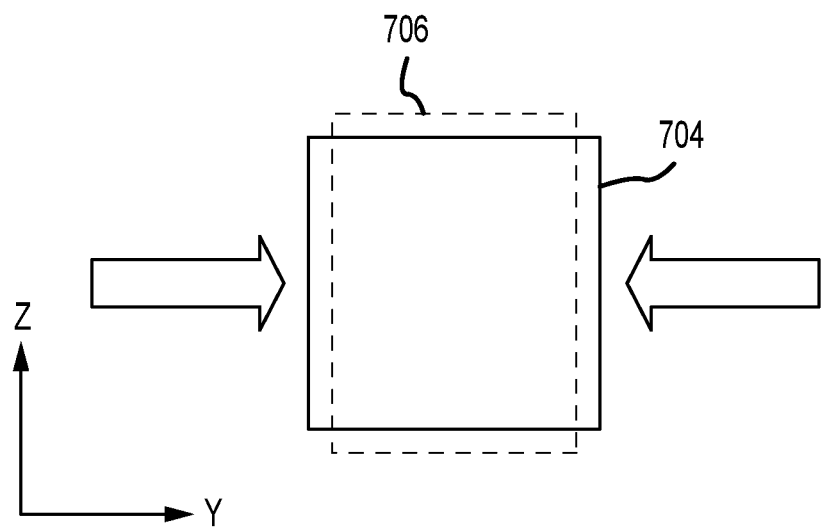
FIGS. 7A and 7B depict changes to the dimensions of a stem portion of an actuator in accordance with embodiments of the present disclosure.
Figure 7B:
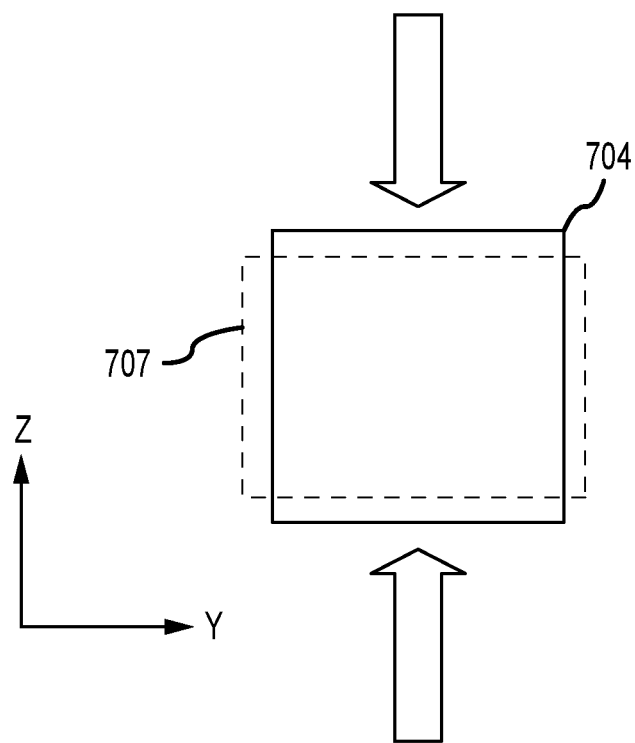
Figure 8:
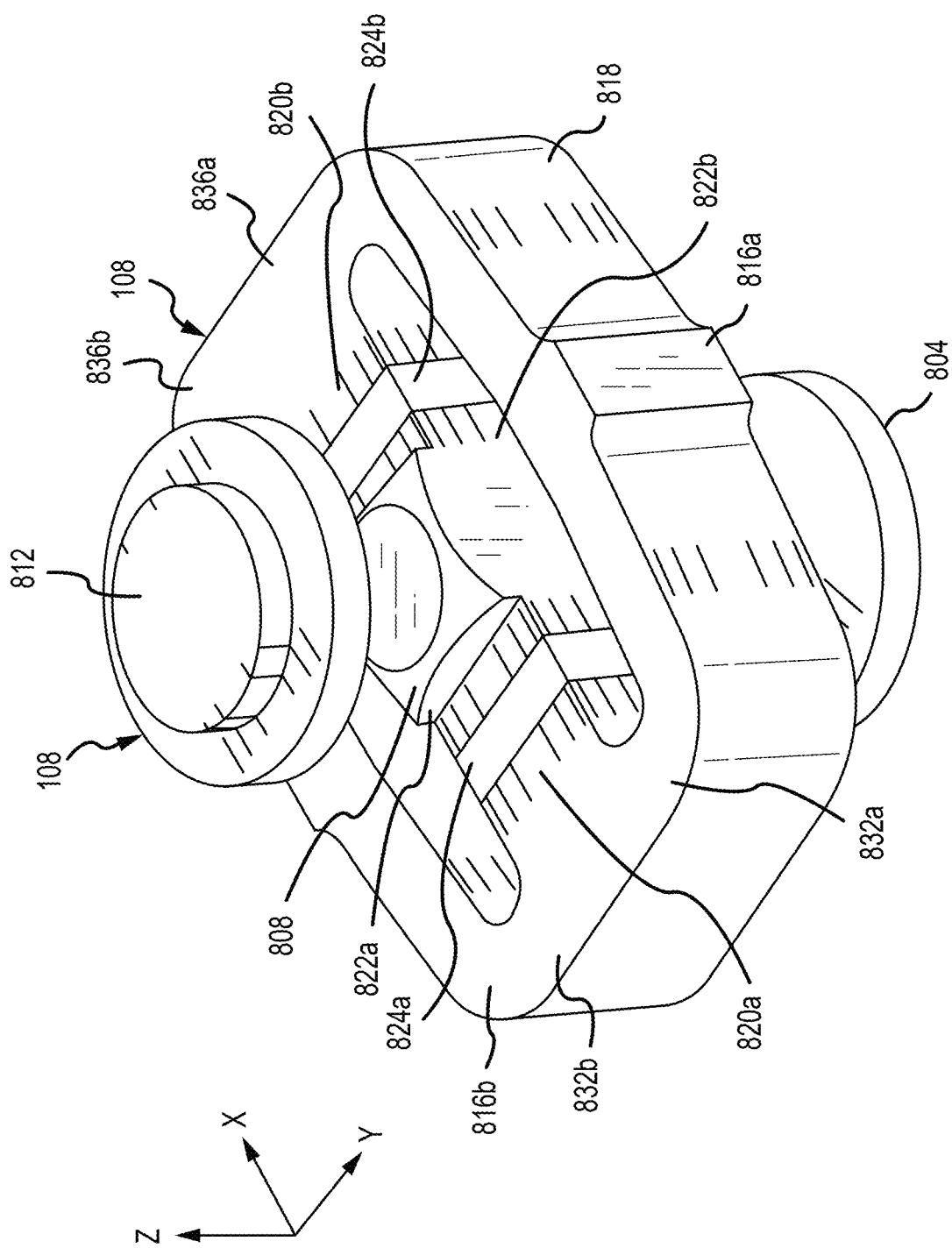
FIG. 8 is a perspective view of an actuator in accordance with other embodiments of the present disclosure.
Figure 11:
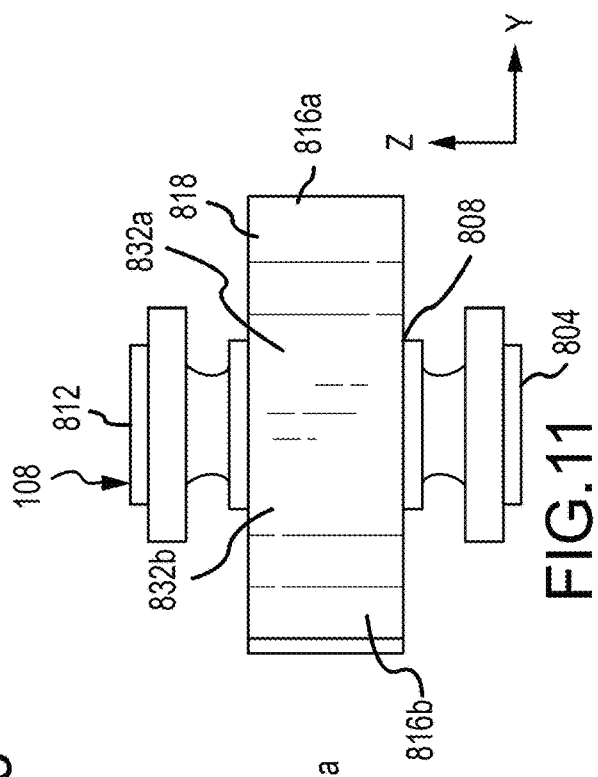
FIG. 11 is an end elevation view of the actuator of FIG. 8.
Figure 9:
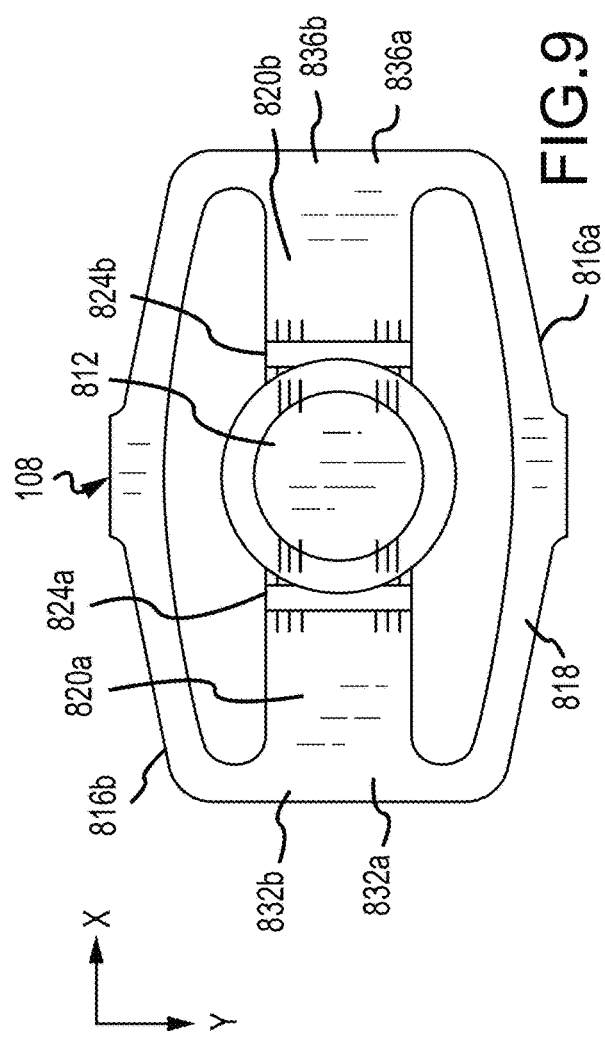
FIG. 9 is a top plan view of the actuator of FIG. 8.
Figure 10:
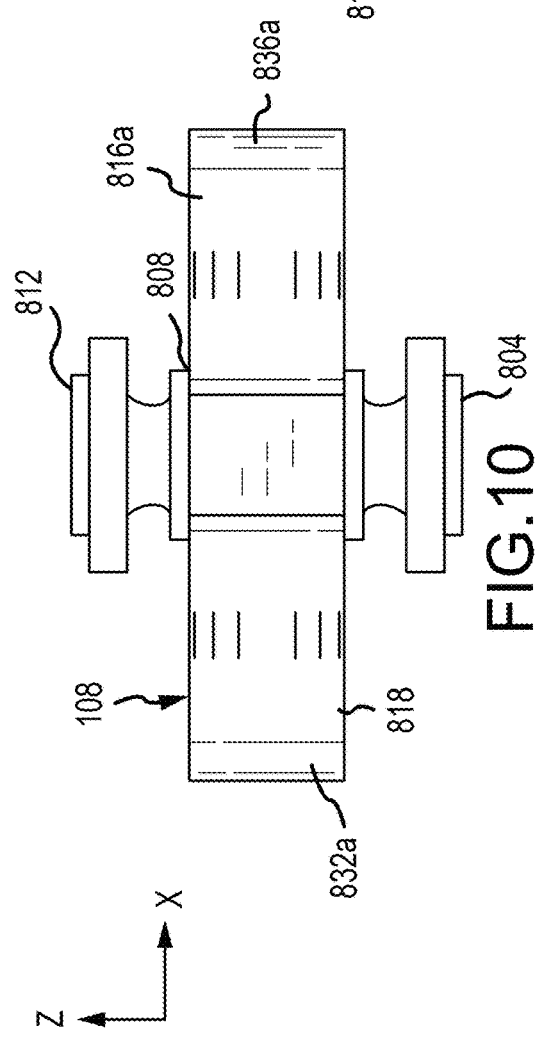
FIG. 10 is a side elevation view of the actuator of FIG. 8.

With reference now to FIGS. 6A and 6B, operational aspects of the example actuator 108 of FIGS. 2-5 are depicted. In particular, an actuator 108 in accordance with embodiments of the present disclosure achieves precise positioning of a supported object through the Poisson effect, in which a material generally expands in a direction perpendicular to a direction of a compressive force, and contracts in a direction perpendicular to a direction of a tensile force. As illustrated in the figures, by operating the prime movers 224a and 224b, the ends 228 and 232 of the actuator arms 216 can be moved away from or towards one another. This in turn applies a force through the load elements 220 to opposite sides of the stem 208. With reference now to FIGS. 7A and 7B, changes to the dimensions of the stem or body 208 portion of the actuator 108 in response to the application of stress is depicted. In particular, in FIG. 7A, the solid line 704 depicts the stem 208 portion of the actuator 108 in an end elevation view with no external force applied to the stem 208. The dashed line 706 depicts the stem while a compressive stress is applied along the Y axis. As shown, when subjected to a compressive force, the width W of the stem 208 (the dimension along the Y axis) is decreased, and the height L of the stem 208 (the dimension along the Z axis) is increased. In FIG. 7B, the relative dimensions of the stem 208 while no external force is applied is depicted by the solid line 704, and the dimensions of the stem 208 while a tensile stress is applied along the Y axis are depicted by the dashed line 707. Under this tensile stress, the width W of the stem 208 is increased, and the height L of the stem 208 is decreased.

The amount of change in the dimensions of a block of material, such as the stem 208, is given by the following equation:

$$\frac{\Delta W}{W} = -v\frac{\Delta L}{L}$$

where v is Poisson's ratio, and is usually a value between 0.15 and 0.4. For example, Poisson's ratio for aluminum is typically given as about 0.33. Accordingly, if the stem 208 is formed from aluminum and has a width W of 10 mm and a height L of 10 mm, a compressive force that reduced the width of the stem 208 by 0.1 mm would result in an increase in the height of the stem 208 by 0.3 mm. Conversely, a tensile force applied to that stem 208 that increased the width of the stem 208 by 0.1 mm would result in a decrease in the height of the stem 208 by 0.3 mm. Accordingly, it can be appreciated that small changes in dimension or small movements can be made in a direction perpendicular to a direction along which a force is applied to a piece of material, such as the block presented by the stem 208 of the actuator 108.

Accordingly, and as shown in FIG. 6A, when the prime movers 224 are operated to apply a force 604 that moves the arms 216 away from one another in a direction parallel to the Y axis in the figure, a tensile force 608 is applied to the load elements 220 and in turn to the stem 208. This tensile force 608 increases the width of the stem 208 (where the width is along the Y axis in the example depicted in the figure), and shortens the stem 208 in the directions perpendicular to the direction of the tensile force 608 (i.e. in the X and Z directions in the figure). Thus the effect of the application of the tensile force is to reduce the distance between the base 204 and the actuation platform 212 (which movement is represented by arrows 612). Conversely, as shown in FIG. 6B, by operating the prime movers 224 to apply a force 605 so that the actuator arms 216 are moved towards one another, a compressive force 609 is applied to the load elements 220 and in turn to the stem 208. This compressive force 609 decreases the width of the stem (along the Y axis in the example depicted in the figure), and lengthens the stem 208 in the directions perpendicular to the direction of the compressive force 609 (i.e. in the X and Z directions in the figure). This compressive force 609 thus increases the distance between the base 204 and the actuation platform 212 (which movement is represented by arrows 614). Accordingly, as can be appreciated by one of skill in the art after consideration of the present disclosure, the prime movers 224 can be operated to apply different amounts of force to effect different changes in the distance between the base 204 and the actuator platform 212. In particular, the prime movers 224 of an actuator 108 in accordance with embodiments of the present disclosure can be operated to supply a selected amount of compressive force or a selected amount of tensile force, to enable changes from a neutral height of the stem 208 in increasing or decreasing amounts. As an example, actuators 108 in accordance with embodiments of the present disclosure enable movement resolutions of one picometer or less over a displacement range of tens of nanometers.

An example actuator 108 in accordance with further embodiments of the present disclosure is depicted in FIGS. 8-11. Similarly to the previous example, the actuator 108 in this example generally includes a base 804, a stem 808, and an actuation platform 812. In addition, the actuator 108 includes first 824a and second 824b prime movers. In this example, the first 824a and second 824b prime movers are connected to and act directly on first 822a and second 822b ends of the stem 808, where the first 822a and second 822b ends are opposite one another. In this example embodiment, the actuator arms 816a and 816b, generally disposed on opposite sides of the stem 808, are joined directly to one another, and in at least some embodiments are integral to one another, forming a continuous hoop 818 around an outer perimeter of the actuator 108 in plan view. The first ends 832a and 832b of the actuator arms 816a and 816b are joined to one another and to an end of the first prime mover 824a opposite the first end 822a of the stem 808 by a first load element 820a. The second ends 836a and 836b of the actuator arms 816a and 816b are joined to one another and to an end of the second prime mover 824b opposite the second end 822b of the stem 808 by a second load element 820b. As in other examples, in at least some embodiments of the present disclosure, the actuator 108 base 804 is mounted to an instrument body or support structure 116, while a mirror segment 112 or other moveable element is mounted to the actuation platform 812.

Figure 12A:
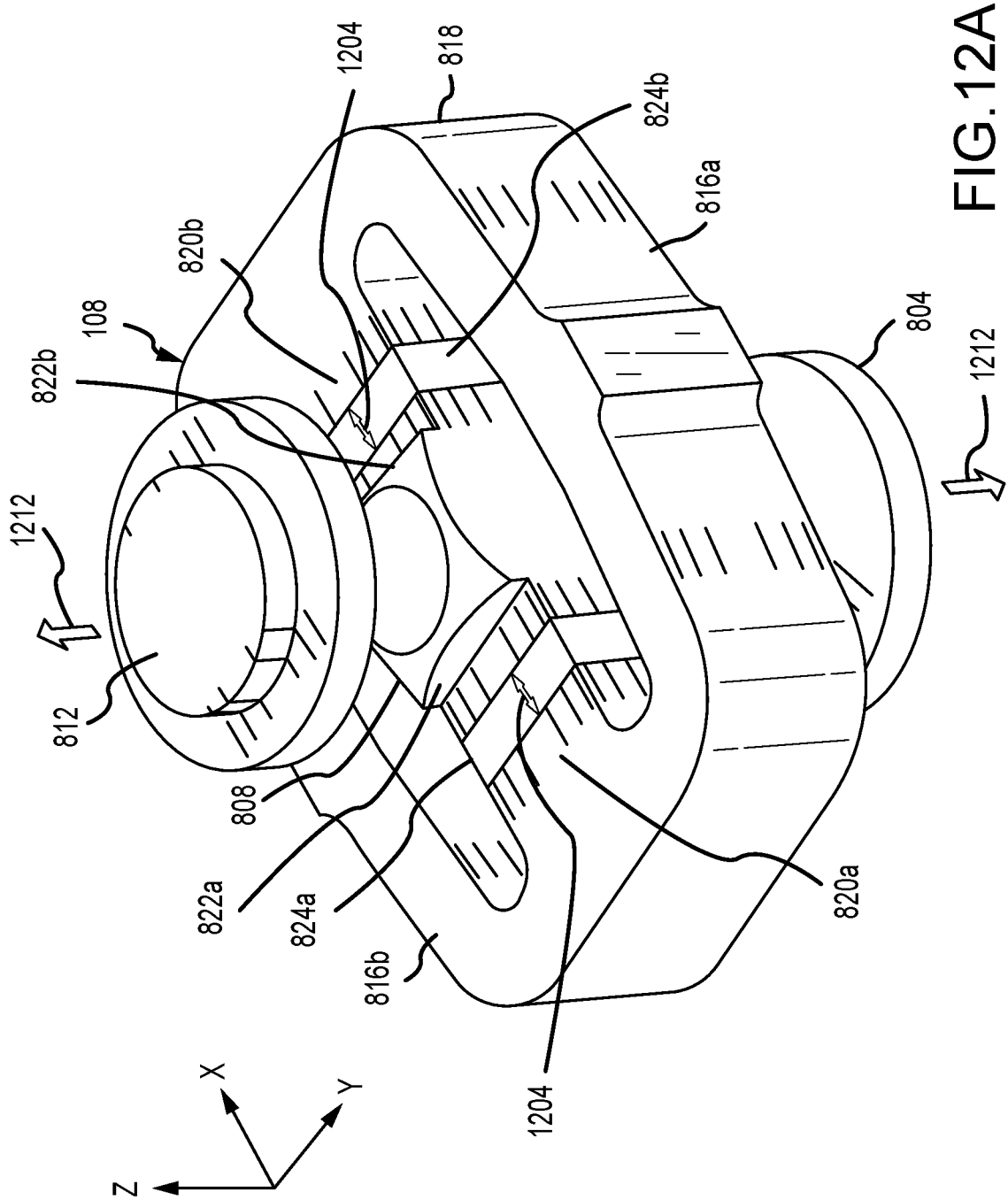
FIGS. 12A and 12B depict operational aspects of the actuator of FIG. 8.
Figure 12B:
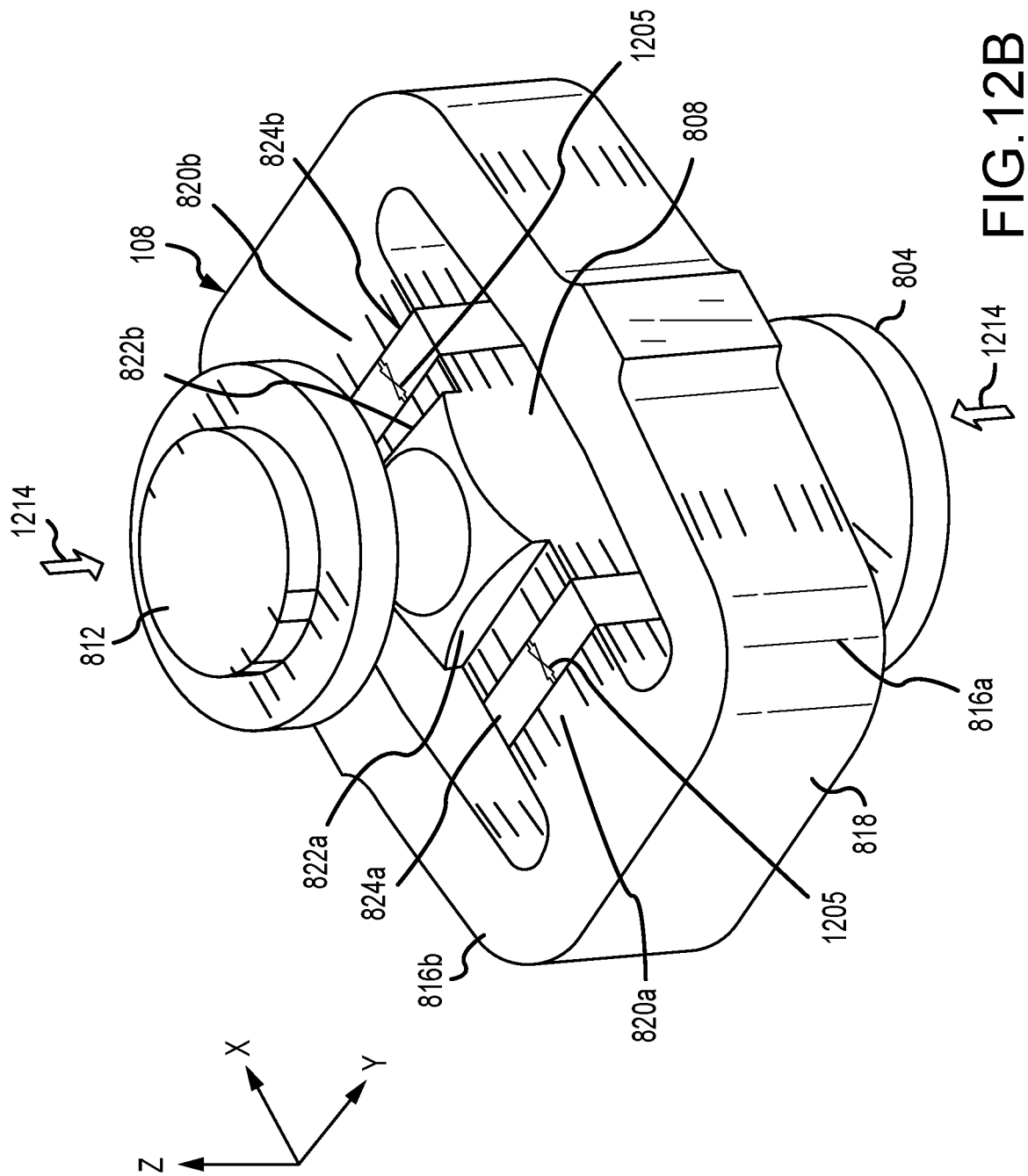

With reference now to FIGS. 12A and 12B, operational aspects of the example actuator 108 of FIGS. 8-11 are depicted. In particular, as in other embodiments of the present disclosure, an actuator 108 as depicted in this second example achieves precise positioning of a supported object through the Poisson effect, in which a material generally expands in a direction perpendicular to a direction of a compressive strain or force, and contracts in a direction perpendicular to a direction of a tensile strain or force.

Accordingly, as illustrated in FIG. 12A, by operating the prime movers 824 to expand in a direction that is parallel to the X axis, the prime movers 824 generate forces 1204 that press against the load elements 820, while compressing the opposite ends 822 of the stem 808. This decreases the length of the stem 808 and in turn increases the height of the stem 808. In particular, by applying a compressive force 1204 to the stem 808 in a direction parallel to the X axis in the figure, thereby decreasing the length of the stem 808 in a direction parallel to the X axis, a height of the stem 808 in a direction parallel to the Z axis in the figure (i.e. along an axis perpendicular to the direction along which the stem 808 is compressed) is increased, as represented by arrows 1212. As illustrated in FIG. 12B, by operating the prime movers 824 to contract in a direction that is parallel to the X axis, the prime movers 824 pull against the load elements 820, applying a tensile force across the opposite ends 822 of the stem 808. This increases the length of the stem 808 and in turn decreases the height of the stem 808. In particular, by applying a tensile force 1205 to the stem 808 in a direction parallel to the X axis in the figure, a length of the stem 808 in a direction parallel to the X axis is increased, and a height of the stem 808 in a direction parallel to the Z axis in the figure (i.e. along an axis perpendicular to the direction along which the stem 808 is expanded) is decreased (as represented by arrows 1214). The surrounding hoop 818 formed by the arms 816a and 816b provides some compliance, which can be used to tune the force applied to the stem 808, and thus the change in the distance between the base 804 and the platform 812 for a given displacement of the prime movers 824a and 824b. Moreover, an actuator 108 in accordance with embodiments of the present disclosure can be operated such that the prime movers 824 selectively apply a compressive force on the stem 808, to increase the distance between the base 804 and the actuation platform 812, or apply a tensile force on the stem 808, to decrease the distance between the base 804 and the actuation platform 812, in steps that are as small as one picometer or less, over a range that can extend across tens of nanometers.

Figure 13:
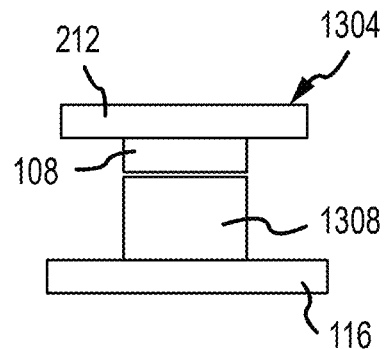
FIG. 13 depicts an actuator assembly incorporating an actuator in accordance with embodiments of the present disclosure.

In accordance with embodiments of the present disclosure, and with reference now to FIG. 13, a hybrid actuator assembly 1304, which combines a high resolution (e.g. picometer) actuator 108 as disclosed herein and a coarse (e.g. millimeter or centimeter) actuator 1308, can be provided. For instance, a base component of a coarse actuator 1304 can be mounted to a support structure 116. The base of the high resolution actuator 108 can then be mounted to a moving platform of the coarse actuator 1308. The actuation platform 212 of the high resolution actuator 108 can then be connected to a moveable or actively controlled element, such as a mirror segment 112. Such a hybrid actuator assembly 1304 can enable both coarse and fine positioning of the controlled or supported element, and can thus provide movement resolution of less than one picometer in combination with a range of movement that extends across multiple millimeters or more. In accordance with still other embodiments, a hybrid actuator assembly 1304 can include one or more high resolution actuators 108 and one or more coarse actuators 1308. In accordance with still other embodiments of the present disclosure, an actuator assembly that includes multiple high resolution actuators 108, and no coarse actuators 1308, can be provided.

Figure 14:
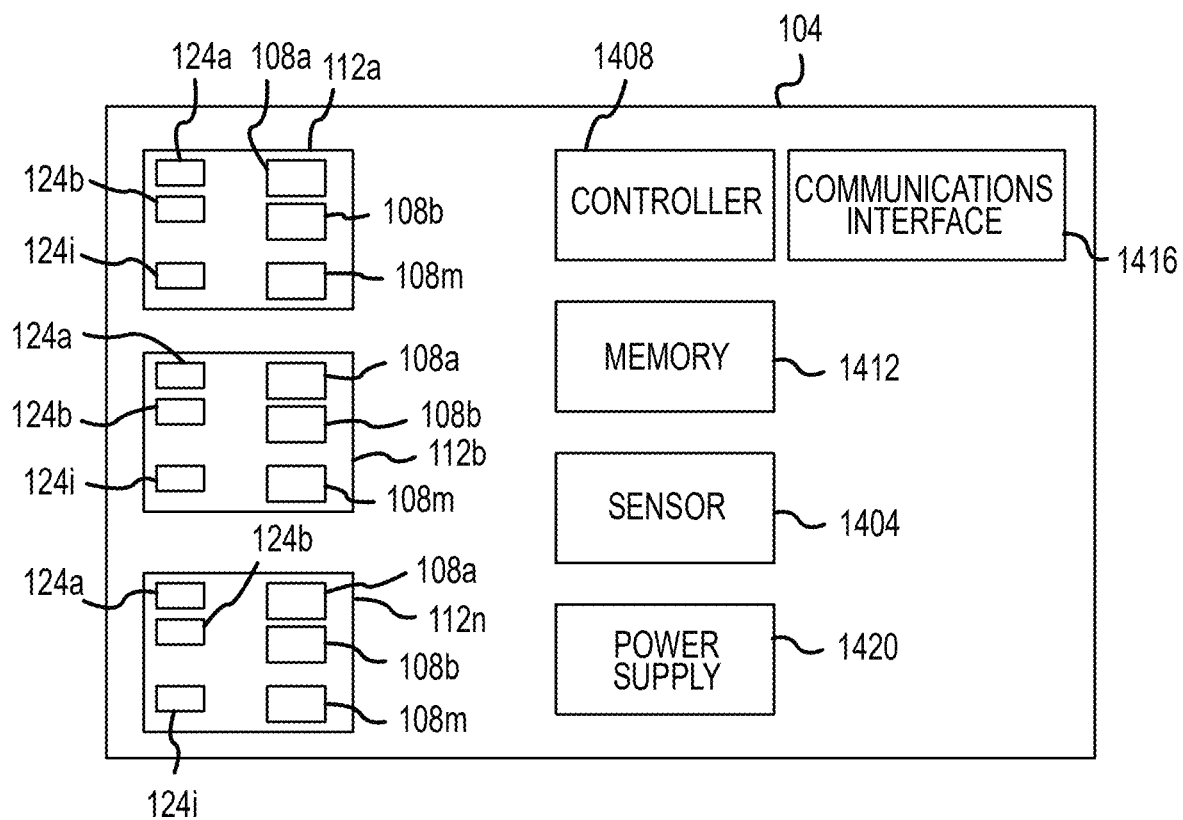
FIG. 14 is a block diagram depicting components of a system in accordance with embodiments of the present disclosure.

FIG. 14 is a block diagram depicting components of a system or instrument 104 in accordance with embodiments of the present disclosure. In this example the instrument 104 is a telescope that includes multiple mirror or reflector segments 112a-n. Each mirror segment 112 is at least partially supported by m actuators 108. In addition, each mirror segment can be associated with i position sensors 124. A sensor 1404, such as an image sensor, receives light or other signals directed to it by the reflector incorporating the mirror or reflector segments 112. The instrument 104 can also include a controller 1408, memory 1412, a communications interface 1416, and a power supply 1420. The controller 1408 can generally execute application programming or firmware for controlling and operating various aspects of the instrument 104, including altering the position of reflector segments 112, by controlling an amount of power provided to the prime movers 224, 824 of individual actuators 108 from the power supply 1420. The alteration of the position of reflector segments 112 can be in response to position signals received from position sensors 124, command signals generated by the execution of the programming or firmware by the controller 1408, command signals received via the communications interface 1416, signals provided by the sensor 1404, or the like. The memory 1412 can store application programming or firmware for execution by the controller 1408, and can store data. The various components of the instrument 104 can be connected to one another by signal lines or busses and power lines or busses.

Actuators 108 in accordance with embodiments of the present disclosure enable picometer-level or resolution actuation to be achieved by applying a force to the actuator stem 208, 808, which changes its height due to the Poisson effect. The example designs described above provide two different methods for applying that force to the stem 208, 808 by coupling the force/displacement from a prime mover 224, 824. The arm 216, 816 geometry can be adjusted to tune the force and thus the actuation. As an example, but without limitation, where the stem 208, 808 is formed from invar, a movement of 50 picometers by the prime movers 224, 824 results in a change to the height of the stem 208, 808 of 0.94 picometers. Accordingly, a distance between a base 204, 804 of the actuator 108 and the actuation platform 212, 812 of the actuator can be selectively increased or decreased in steps of less than one picometer, as determined by the resolution of the chosen prime mover and the tunable motion reduction factor of the mechanical design, where the motion reduction factor is the ratio of the prime mover displacement to the actuator height change.

An additional benefit of actuators 108 as disclosed herein is that the load path is through the stem 208, 808, which allows for higher loads to be supported as compared to devices incorporating flexures or other mechanisms. In addition, this configuration removes the prime movers 224, 824 from the load path. The prime movers 224, 824 chosen must provide adequate force to achieve the desired actuation. The arms 216, 816 then apply a force laterally to the stem 208, 808, which will change its height vertically via the Poisson effect. The stiffness of the arms 216, 816 can be tuned to change the applied force (and thus actuation) for a given displacement of the prime mover.

In accordance with embodiments of the present disclosure, two prime movers 224, 824, which can be PZTs, PMNs, voice coils, or any device that provides linear actuation suitable for the application environment, have voltage applied to them, which compresses (or expands) the stem 208, 808 in one dimension. Due to the Poisson effect (a material dependent parameter), compression (or expansion) of the stem 208, 808 laterally will change its height vertically. The surrounding structure or hoop formed by the arms 216, 816 provides some compliance which can be used to tune the force applied to the stem 208, 808 (and thus the actuation) for a given displacement of the prime mover 224, 824. In accordance with still other embodiments of the present disclosure, different numbers of prime movers 224, 824 can be included in the actuator 108.

Figure 15:
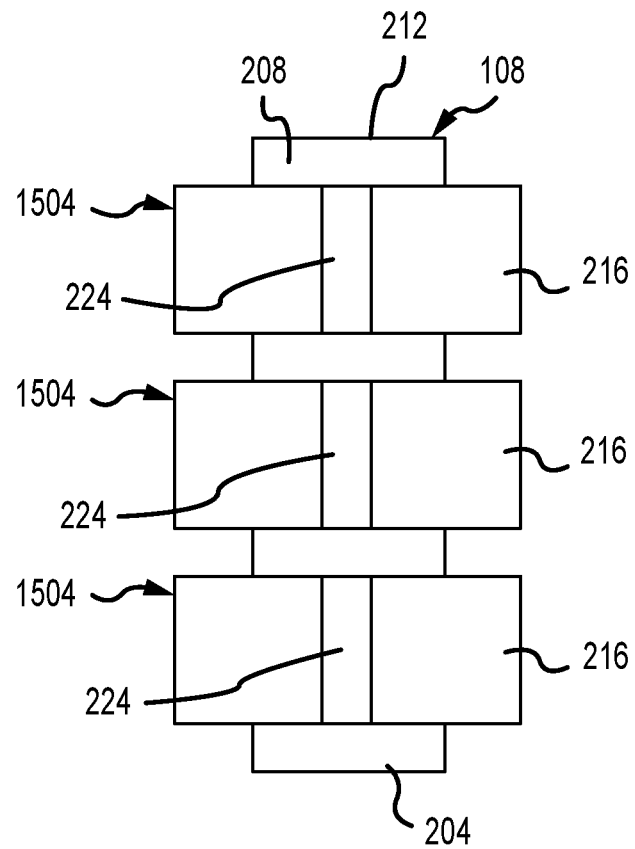
FIG. 15 is an end elevation view of an actuator having multiple arm and prime mover sub-assemblies.

In accordance with further embodiments of the present disclosure, an actuator 108 can include a single stem 208, 808 that is acted on by more than one set or sub-assembly 1504 of arms 216, 816 and prime movers 224, 824. An example of an actuator 108 thus configured is illustrated in an end elevation view in FIG. 15. In this example, three sub-assemblies 1504 of arms 216 and prime movers 224, configured similarly to those of the example of FIGS. 2-5, act on different segments or portions of a common stem 208. This enables an increased range of motion as compared to a configuration with a single set of arms 216 and prime movers 224. In addition, by providing multiple arm 216 and prime mover 224 sub-assemblies 1504, redundant operation is enabled if one arm 216 and prime mover 224 sub-assembly becomes inoperable. An actuator 108 having multiple sub-assemblies 1504 with arms 816 and prime movers 824 configured similarly to those of the example of FIGS. 8-11 can also be provided. Embodiments configured with multiple arm 216, 816 and prime mover 224, 824 sub-assemblies 1504 can also be combined in series with coarse actuators and/or other actuators 108 as disclosed herein.

Embodiments of the present disclosure provide systems and methods to position meter-class optics in a segmented telescope or any other system or instrument with picometer-level resolution and 10 s of nanometers of range. In addition to use in combination with an optical component, such as a mirror, a fast steering mirror, a scanning mirror, or a lens, embodiments of the present disclosure can be used to support any device or component for which precise movement over a limited amount of travel relative to a base or other structure or component is desired. Examples of such additional devices include, but are not limited to, microscopes, robotic surgical systems, optical communication systems, or any other system benefitting from an ability to reliably move a component with a high level of precision. Actuators in accordance with embodiments of the present disclosure can be combined with existing actuators with nanometer-level resolution and mm of range to achieve alignment and stabilization of components.

As can be appreciated by one of skill in the art after consideration of the present disclosure, actuators 108 providing fine resolution as disclosed herein are not limited to use in any particular application or structure. Instead, an actuator 108 or plurality of actuators 108 can be incorporated into any assembly in which fine control of a position of a component is desired. Moreover, such assemblies can have various moving platform configurations, depending on their particular application and requirements. Examples of moving platforms that can incorporate actuators 108 in accordance with embodiments of the present disclosure include, but are not limited to, tripods, hexapods, or other platforms. Moreover, a high resolution actuator 108 as disclosed herein can be combined with coarse actuators to provide fine control over a relatively large range.

In accordance with at least some embodiments of the present disclosure, components or elements of the actuator are formed from a first, unitary piece of material. The material can be a metal, such as aluminum, steel, or alloys thereof, a composite, or other material. In accordance with other embodiments of the present disclosure, different components of the actuator are formed from different materials.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. An actuator, comprising:
  a stem;
  a base, wherein the base is joined to a first end of the stem;
  an actuation platform, wherein the actuation platform is joined to a second end of the stem, and wherein the first end of the stem is opposite the second end of the stem;
  a first arm, wherein the first arm is disposed on a first side of the stem;
  a second arm, wherein the second arm is disposed on a second side of the stem, and wherein the first side of the stem is opposite the second side of the stem;
  a first prime mover, wherein the first prime mover is joined to a first end of the first arm and to a first end of the second arm; and
  a second prime mover, wherein the second prime mover is joined to a second end of the first arm and to a second end of the second arm, wherein the prime movers are operable to selectively apply at least one of a compressive force or a tensile force to opposite sides of the stem, and wherein, in response to the force applied by the prime movers, a distance between the base and the actuation platform is changed.

2. The actuator of claim 1, further comprising:
  a first load element, wherein the first side of the stem is joined to a midpoint of the first arm by the first load element; and
  a second load element, wherein the second side of the stem is joined to a midpoint of the second arm by the second load element.

3. The actuator of claim 2, wherein the first and second prime movers are operable to act on respective ends of the first and second arms to apply a force to the first and second sides of the stem.

4. The actuator of claim 1, wherein the first prime mover is joined to a third side of the stem in addition to the first end of the first arm, and the first end of the second arm, and
  wherein the second prime mover is joined to a fourth side of the stem in addition to the second end of the first arm and the second end of the second arm.

5. The actuator of claim 4, wherein the first and second prime movers are operable to apply a force to the third and fourth sides of the stem.

6. The actuator of claim 1, wherein each of the prime movers is a linear actuator.

7. The actuator of claim 1, wherein each of the prime movers includes a piezoelectric element.

8. The actuator of claim 1, wherein the stem, the base, and the actuation platform are formed from a first unitary piece of material.

9. The actuator of claim 8, wherein the arms are formed from a second unitary piece of material.

10. The actuator of claim 1, wherein the stem, the base, the actuation platform, and the arms are formed from a first unitary piece of material.

11. A system, comprising:
  a supported element;
  a support structure;
  at least one actuator, wherein the at least one actuator includes:
    a stem;
    a base, wherein the base is joined to a first end of the stem and to the support structure;
    an actuation platform, wherein the actuation platform is joined to a second end of the stem and to the supported element;
    a first prime mover;
    a second prime movers;
    a first arm, wherein a midpoint of the first arm is joined to a first side of the stem by a first load element; and
    a second arm wherein a midpoint of the second arm is joined to a second side of the stem by a second load element, wherein the first prime mover is disposed between a first end of the first arm and a first end of the second arm, wherein the second prime mover is disposed between a second end of the first arm and a second end of the second arm, wherein operation of the prime mover in cooperation with the first and second arms applies a force to the stem along a first direction, wherein, in response to the applied force, the stem changes a dimension along a second direction that is perpendicular to the first direction, and wherein a distance between the base and the actuation platform is changed.

12. The system of claim 11, wherein the first and second prime movers are piezoelectric transducers.

13. The system of claim 11, further comprising:
   a plurality of position sensors;
   a power supply; and
   a controller, wherein the controller operates the first and second prime movers by selectively providing power from the power supply to the prime movers in response to signals from the position sensors included in the plurality of position sensors.

14. The system of claim 13, wherein the supported element is a mirror segment.

15. The system of claim 14, wherein the mirror segment is moved with a resolution of one picometer.

16. The system of claim 11, wherein the supported element is a mirror segment.

17. The system of claim 11, wherein the system includes at least three actuators.

18. The system of claim 17, wherein the supported element is a mirror segment, and wherein each of the at least three actuator is joined to the support structure.

19. The system of claim 11, wherein the stem, the base, and the actuation platform are formed from a first unitary piece of material.

* * * * *